United States Patent Office 3,219,192
Patented Nov. 23, 1965

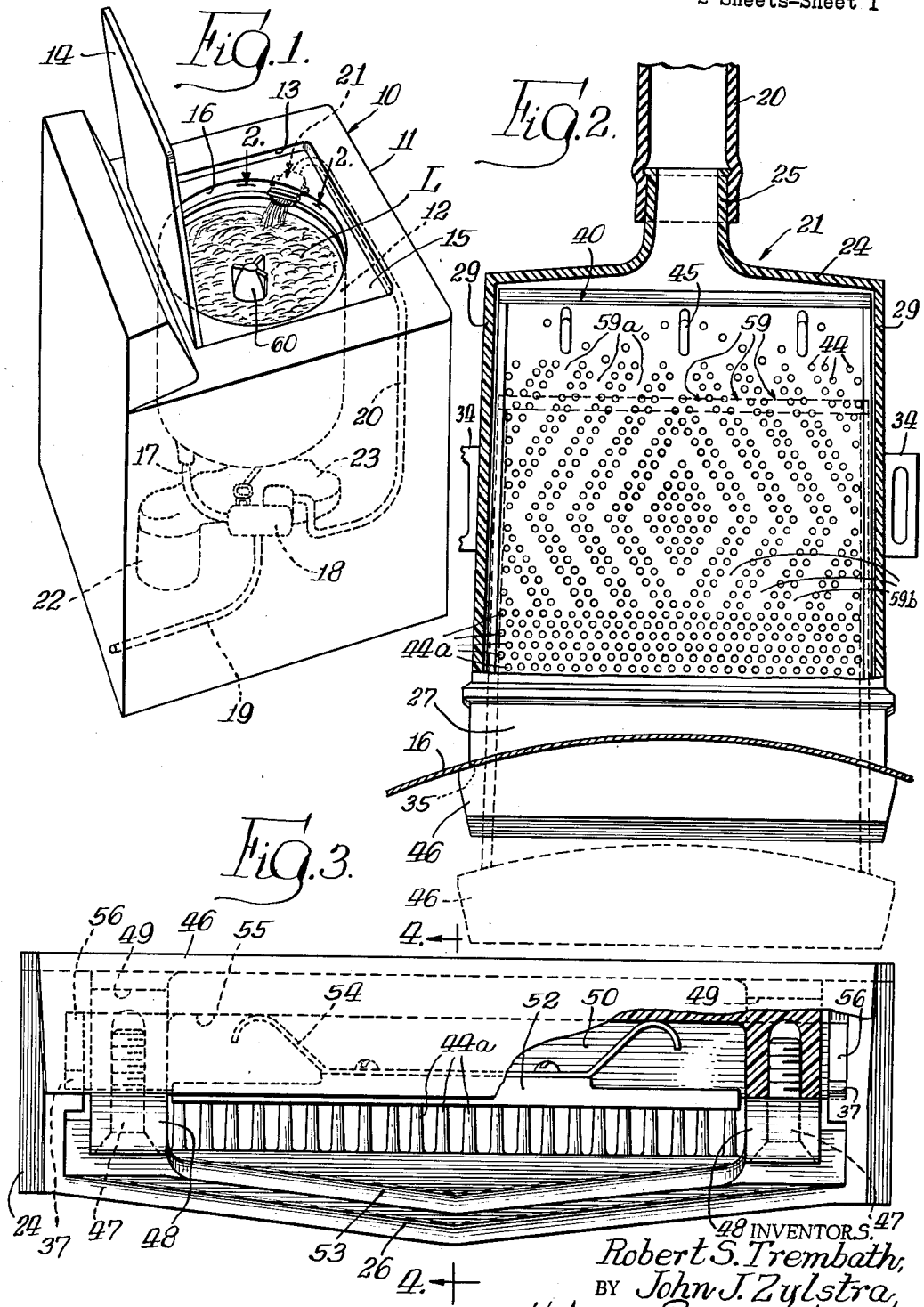

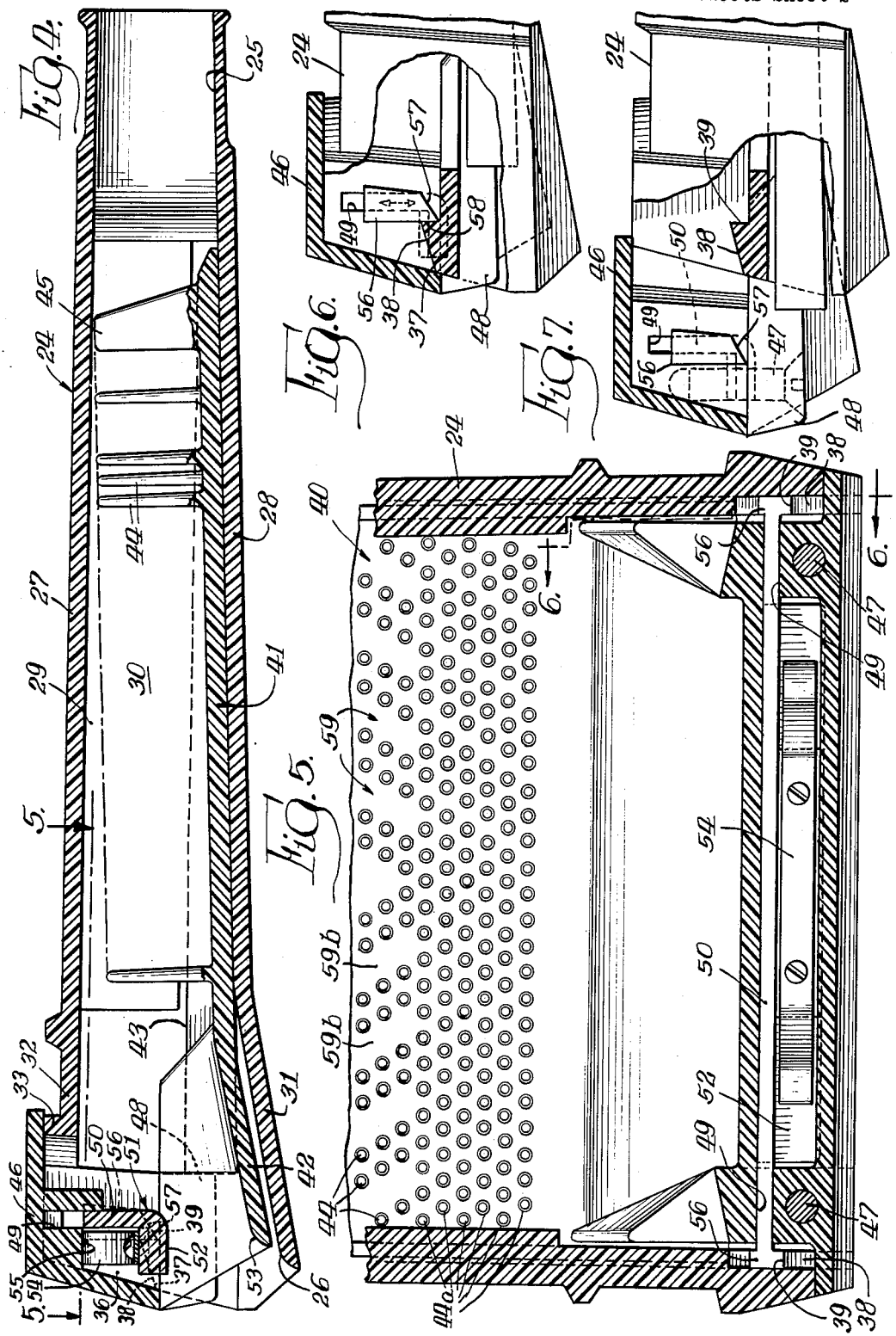

3,219,192
FILTER FOR WASHING APPARATUS
Robert S. Trembath and John J. Zylstra, Benton Harbor, Mich., assignors to Whirlpool Corporation, a Delaware corporation
Filed July 26, 1962, Ser. No. 212,674
1 Claim. (Cl. 210—449)

This invention relates to filters, and in particular, to filters for moving lint in a fluid system.

In Glendening Patent 2,936,604 issued May 17, 1960, a laundry machine is disclosed having an automatic lint filter for removing lint from the laundry liquid continuously during the washing and rising cycles. More specifically, the filter in installed in the cover overlying the tub of the laundry machine. The machine further includes recirculating means for recirculating laundry liquid from the tub through the filter and back into the tub during the washing and rinsing cycles. The present invention comprehends an improved filter structure for use in such a fluid system, providing a number of desirable advantages therein.

Thus, a principal feature of the present invention is the provision of a new and improved filter for use in a fluid system.

Another feature of the invention is the provision of such a filter including a housing defining a flow passage and having an inlet and an outlet, and a filter member removably installed in the flow passage including a support portion and a plurality of fingers projecting from the support portion across the flow passage, the fingers being individually spaced and distributed to define a circuitous flow path through the passage bounded by the spaced lint collecting fingers along substantially the entire length of the flow path whereby lint material carried by the fluid is caught by the fingers substantially uniformly throughout the filter.

A further feature of the invention is the provision of such a filter including a support portion having a plurality of fingers upstanding therefrom and forming a circuitous flow path to evenly distribute the lint throughout the filter to prevent clogging of the filter during the filtering period.

A still further feature of the invention is the provision of such a filter arranged for facilitated removal of the collected lint as by rising of the lint therefrom subsequent to the removal of the filter member from the housing.

Still another feature of the invention is the provision of such a filter provided with new and improved means for retention of the filter member releasably within the housing.

A still further feature of the invention is the provision of such a filter of simple and economical construction yet providing a highly efficient means for removing lint from the fluid circulated therethrough.

Other features and advantages of the invention will be apparent from the following description taken in connection with the accompanying drawing wherein:

FIGURE 1 is a perspective view of a laundry machine provided with a filter embodying the invention, portions of the circulation system being shown in dotted lines;

FIGURE 2 is an enlarged plan view of the filter, portions thereof being broken away to facilitate the illustration thereof, and the filter member being shown in broken lines in a partially removed position illustrating the movement thereof during removal from the housing;

FIGURE 3 is a further enlarged front elevation thereof with portions broken away to facilitate the illustration;

FIGURE 4 is a longitudinal section thereof taken substantially along the line 4—4 of FIGURE 3;

FIGURE 5 is a fragmentary horizontal section thereof taken substantially along the line 5—5 of FIGURE 4;

FIGURE 6 is a fragmentary vertical section taken substantially along the line 6—6 of FIGURE 5; and FIGURE 7 is a fragmentary vertical section of the portion thereof illustrated in FIGURE 6, but as arranged subsequent to a release of the filter member as during removal thereof from the housing.

In the exemplary embodiment of the invention as disclosed in the drawing, an automatic washing machine generally designated 10 is shown to comprise a cabinet 11 having a conventional tub 12 accessible through a top opening 13 in the cabinet 11 selectively closed by a lid 14. The cabinet 11 includes a recessed top portion 15 having a downturned flange portion 16 defining the opening 13. Laundry liquid L is pumped from the tub 12 through an outlet conduit 17 by a suitable conventional pump 18. The pump is arranged for selective delivery of the washing liquid through a drain conduit 19, or through a return conduit 20 to a filter generally designated 21, through which the laundry liquid passes back into the tub 12 as shown in FIGURE 1. A suitable electric motor 22 is provided for driving a conventional transmission 23 for operating the agitator 60 within tub 12 and for driving the pump 18.

As indicated briefly above, the present invention is concerned primarily with the filter 21 herein provided for removing lint and the like from the laundry liquid circulated from conduit 20 back to tub 12. Referring now more specifically to FIGURES 2 through 7, the filter 21 is seen to comprise a housing 24 having an inlet 25 connected to the conduit 20, and an outlet 26 overlying the tub 12. As best seen in FIGURE 4, the housing includes a generally horizontal top wall 27 and a downwardly inclined bottom wall 28 cooperating with side walls 29 to define a flow passage 30 vertically widening from inlet 25 to outlet 26. As shown in FIGURE 4, the bottom wall 28 terminates in a downturned lower lip 31 extending beyond the corresponding upper end 32 of top wall 27 which terminates in an upturned flange 33. As best seen in FIGURE 2, the side walls 29 may be provided with a pair of apertured brackets 34 for securing the housing to the underside of cabinet portion 15 in alignment with an opening 35 in portion 16.

At the front end 36 of the side walls 29, the housing is provided with a pair of cam shoulders 37 each having a forward inclined surface 38 and a rearward shoulder 39.

Referring again to FIGURE 2, the filter 21 is seen to further include a filter member generally designated 40. The filter member includes a relatively rigid transverse bottom wall 41 defining a flume and having a length somewhat less than the length of bottom wall 28 of housing 24. The front end of the bottom wall 41 is downturned slightly to define a lip 42 overlying lip 31 of the housing bottom wall and a pair of side walls 43 are provided on the side margins of the bottom wall extending substantially the length thereof. The major portion of the bottom wall 41 is provided with a plurality of upstanding fingers 44 tapering upwardly toward their distal ends. The fingers are distributed, as best seen in FIGURES 2 and 5, to define a plurality of angled paths 59 for the laundry liquid as it passes through the flow passage 30. Each path 59 includes a forward portion 59a angled outwardly toward the side walls 29 of the housing and a rearward portion 59b angled back toward the center line of the housing. The fingers defining the paths are spaced apart so that some of the laundry liquid flows between the fingers in moving through the filter. Where the water passes between the fingers, the lint and similar material is caught by the fingers and thereby effectively filtered from the liquid. However, as some flow of the laundry liquid is effectively through the paths 59 all the way to the rearmost fingers 44a substantially uniform filtration is effected throughout the entire length of the filter. The rearmost fingers 44a are evenly distributed, whereby the paths 59 effectively terminate at the forward end of the group of fingers 44a. Thus, the fingers 44a provide a small amount of back pressure on the liquid passing through the filter whereas the liquid has substantially free flow through the paths 59. This distribution of the fingers has been found to provide a highly effective improved removal of lint and the like from the laundry liquid.

At its rear end, the bottom wall 41 is provided with three upstanding end elements 45 having a shape generally similar to that of an aircraft rudder. As best seen in FIGURE 4, the height of the end elements 45 is preferably sufficient to cause them to extend to adjacent the upper wall 27 of the housing 24 when the filter member 40 is fully inserted into the housing. In the illustrated embodiment, the filter member is formed of a suitable plastic or soft rubber whereby each of the support portion 41 and the fingers 44 are resilient permitting facilitated cleaning of the filter member as will be described more fully hereinafter.

At its front end, the filter member 40 is provided with a handle 46 which is secured at its opposite sides by means of screws 47 to a pair of upstanding bosses 48 on the bottom wall 41. The handle includes a downwardly opening slot 49 in which an upturned leg 50 of a latch bar 51 is vertically slidably received. The lower end 52 of the latch bar extends horizontally upwardly for engagement by the user's fingers inserted through the opening 53 defined between the handle 46 and the lip 42 of the filter member bottom wall 41. The latch bar is biased downwardly by a leaf spring 54 engaging a downwardly facing shoulder 55 immediately forwardly of the slot 49. The opposite ends 56 of the latch bar 51 are arranged for releasable engagement with the cam shoulders 37 and include an inclined lower surface 57 which slides over the cam surface 38 as the filter member is moved rearwardly to the position of FIGURE 4 to have a forward shoulder 58 thereof latched behind the shoulder 39 of the cam shoulders 37, as shown in FIGURE 6. Spring 54 retains the latch bar ends 56 in retaining engagement with the cam shoulders 37 during the normal use of the filter.

When it is desired to remove the filter as for cleaning, the user merely presses upwardly on the latch bar 51 disengaging the ends 56 thereof from the cam shoulders 37 and permitting the filter member 40 to be removed forwardly from the housing 24 through the outlet 26 thereof. To remove the collected lint from the fingers 44, the user need merely turn the filter member upside down and with a gentle tapping action cause the lint to slip downwardly from the tapered fingers. To facilitate the removal of the lint, the resilient filter member may be flexed to separate the fingers slightly, thereby releasing the collected lint more readily. The filter member may be rinsed to remove the collected lint completely therefrom.

To reinstall the filter member in the housing 24, the filter member is merely reinserted through the outlet 26 with the end thereof carrying the end elements 45 entering the outlet first. When the filter member is inserted fully to the position of FIGURE 4, the latch bar ends 56 automatically re-engage the cam shoulders 37 to retain the filter positively within the housing.

The filter member 40 provides an improved lint removal from the laundry liquid while permitting facilitated cleaning thereof for maintained efficiency of the lint removal. The filter 21 is extremely simple and economical of construction and provides long trouble-free life requiring substantially no maintenance other than the periodic cleaning of the fingers 44, as discussed above.

While we have shown and described one embodiment of our invention, it is to be understood that it is capable of many modifications. Changes, therefore, in the construction and arrangement may be made without departing from the spirit and scope of the invention as defined in the appended claim.

The embodiments of the invention in which an exclusive property or privilege is claimed are defined as follows:

A filter for use in a fluid system, comprising: a housing defining a flow passage and having an inlet and an outlet; and a filter member removably installed in said flow passage including a support portion and a plurality of spaced lint collecting fingers projecting from said support portion across said flow passage, said fingers being individually spaced and distributed to define a circuitous flow path through said passage bounded by the spaced lint collecting fingers along substantially the entire length of the flow path whereby lint material carried by the fluid is caught by said fingers substantially uniformly throughout said filter, said filter member having an inlet end and side portions, said fingers being arranged to define a plurality of relatively free flow paths therebetween angled toward said side portions from said inlet, and a group of said fingers at the inlet end being arranged in a W-configuration extending substantially fully across the support portion with the central point of the W-configuration substantially centered between said side portions and facing toward the passage inlet.

References Cited by the Examiner
UNITED STATES PATENTS

| | | | |
|---|---|---|---|
| 1,709,291 | 4/1929 | Vidler | 210—155 |
| 2,439,535 | 4/1948 | Wilson | 210—447 X |
| 2,754,097 | 7/1956 | Hjulian | 210—499 X |
| 2,936,604 | 5/1960 | Glendening | 210—167 X |
| 2,939,305 | 6/1960 | Snyder et al. | 68—18 |
| 2,984,359 | 5/1961 | O'Brien | 68—18 |
| 3,088,305 | 5/1963 | Ohmann | 68—18 |

REUBEN FRIEDMAN, *Primary Examiner.*

HERBERT L. MARTIN, *Examiner.*